Dec. 8, 1931. W. T. BARKER, JR 1,835,553
GLASS FEEDING APPARATUS
Filed Nov. 2, 1927 2 Sheets-Sheet 1
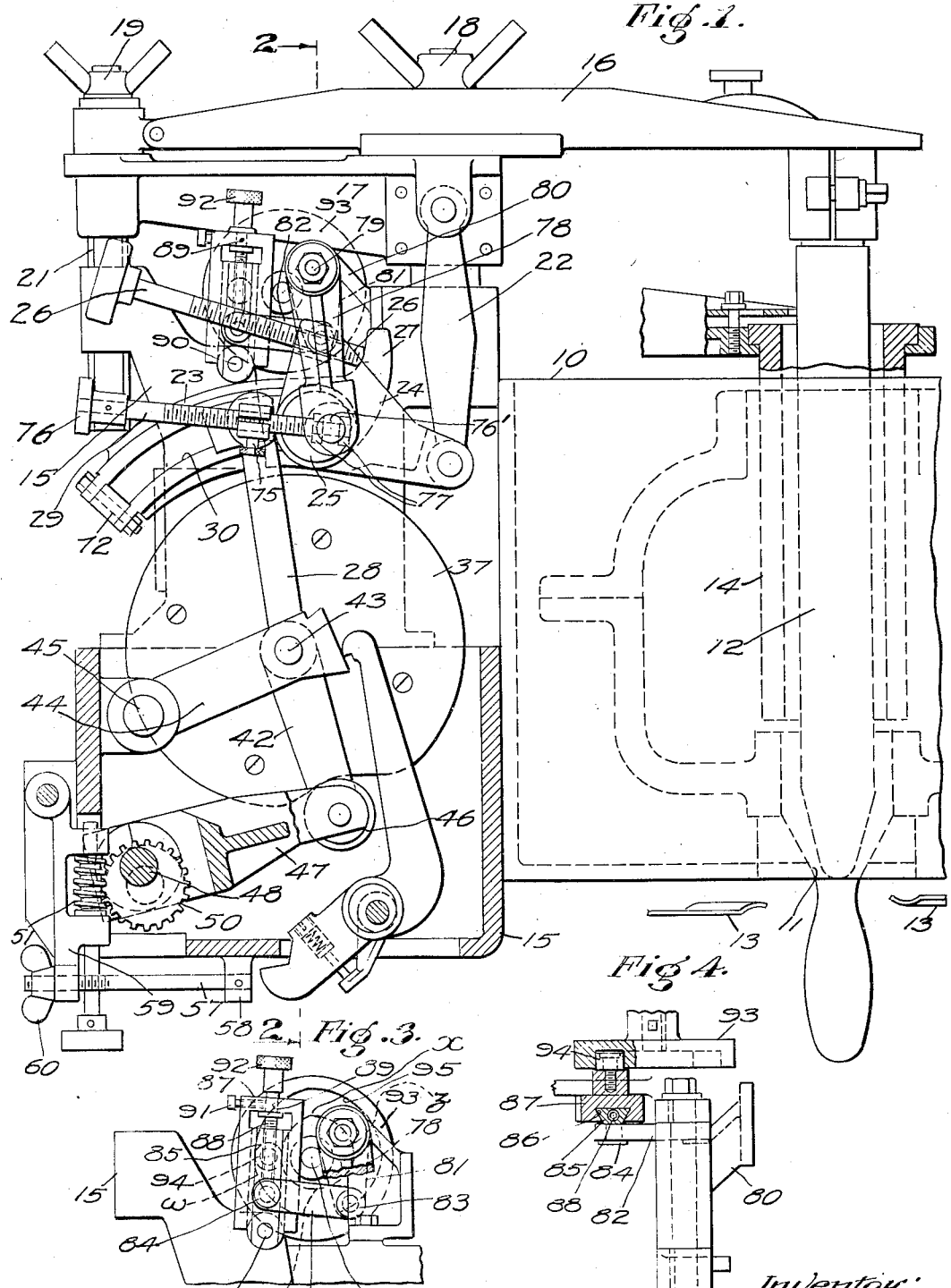
Witness.
A. C. Kaiser.
Inventor:
William T. Barker Jr.
by Robert D. Brown
Attorney.

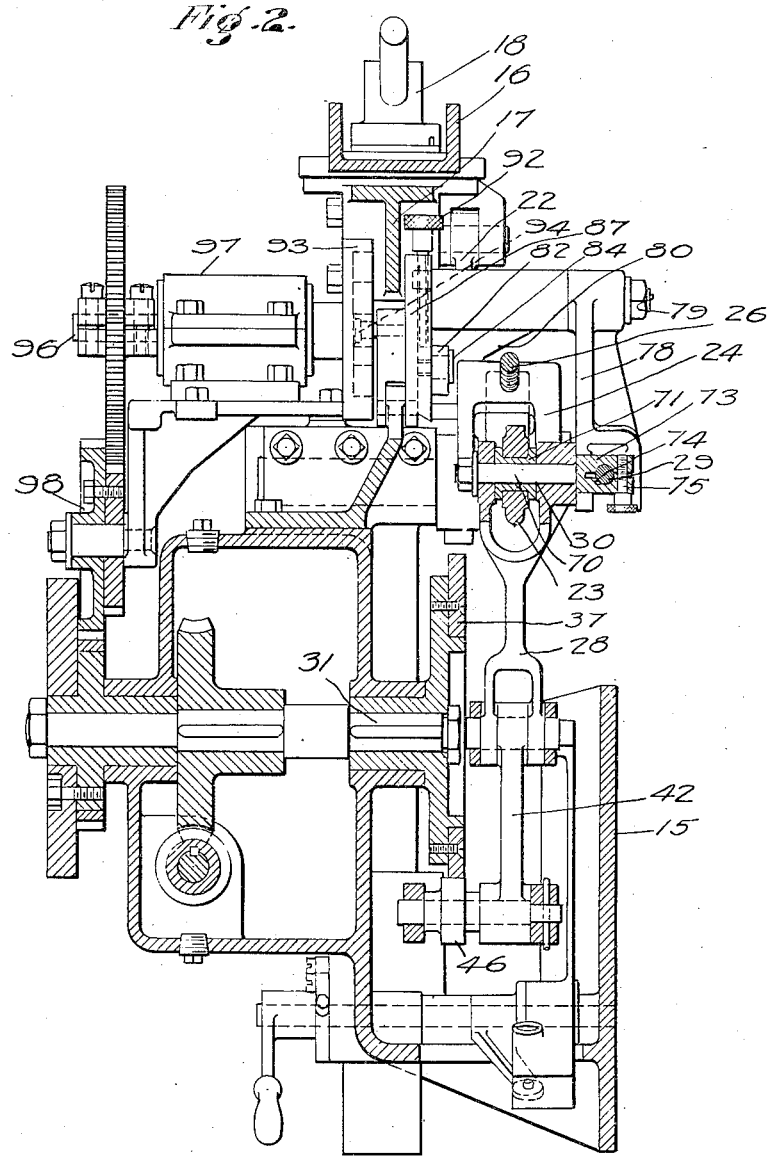

Patented Dec. 8, 1931

1,835,553

UNITED STATES PATENT OFFICE

WILLIAM T. BARKER, JR., OF HARTFORD, CONNECTICUT, ASSIGNOR TO HARTFORD-EMPIRE COMPANY, OF HARTFORD, CONNECTICUT, A CORPORATION OF DELAWARE

GLASS FEEDING APPARATUS

Application filed November 2, 1927. Serial No. 230,496.

This invention relates generally to improvements in apparatus for feeding molten glass in mold charges of controllable shape and size and severed while in suspension from the source of supply of molten glass.

The invention in its mechanical aspects relates more particularly to an improved glass feeding apparatus of the character above indicated which is capable of adjustment to automatically deliver mold charges of the same predetermined regulable weight in a cyclic order while one adjustment of such feeding machine is maintained and to automatically deliver mold charges of a plurality of different predetermined regulable weights in a cyclic order when a different adjustment of such feeding apparatus has been effected, whereby a single feeding apparatus may be used when desired to deliver mold charges of different weights to the molds of a plurality of different fabricating machines or to molds of different sizes on the same fabricating machine.

One type of modern automatic glass feeding apparatus in use prior to the present invention includes a cam operated plunger which reciprocates in adhesive contact with the glass in a fore-hearth or like glass container toward and from a discharge outlet in the bottom of such container. The stroke of the plunger in the glass container toward the outlet accelerates the flow of glass through the outlet while the return or upward stroke of the plunger retards, stops, or reverses the flow of glass in the outlet. The reciprocations of the plunger therefore aid in suspending the glass issuing from the outlet in successive masses below the outlet and in shaping such masses while they are thus suspended. Mechanical shears are operated to close periodically beneath the outlet for severing mold charges from the successive masses of glass suspended below the outlet.

An automatic glass feeding apparatus of the type just described is disclosed in U. S. Patent No. 1,596,438, granted August 17, 1926 to Edward H. Lorenz, assignor to the Hartford-Empire Company.

A glass feeding apparatus of the type described is capable of supplying mold charges of sufficient number to keep several fabricating machines in operation at the same time. It is desirable that such feeding apparatus should be capable of delivering mold charges of regulable but different weights in a cyclic order without an operating adjustment of the apparatus for each change of weight. The apparatus then may function automatically after an appropriate adjustment of its operating mechanism has been effected to deliver mold charges of a given weight to molds of an associated fabricating machine and also mold charges of regulable but different weight or weights to other molds of the same or a different associated fabricating machine. The same feeder thus may be employed to supply mold charges for the production of glassware of different sizes by simultaneously operating fabricating machines or during the same cycle of operations of a single fabricating machine.

An object of the present invention therefore is to improve a glass feeding apparatus of the type disclosed in the aforesaid patent to E. H. Lorenz so that such feeding apparatus will be adapted to deliver mold charges of different regulable weights in a cyclic order to a plurality of simultaneously operating fabricating machines or to the molds of a plurality of different sizes on the same fabricating machine.

A further object of the invention is to provide an automatic glass feeder of the type described with an attachment which can be adjusted to coact with the usual plunger operating mechanism of the feeder so as to change automatically with constant frequency and in a cyclic order the amplitude of different reciprocations of the plunger, as every other or alternate reciprocation thereof, without changing the lowest position of the plunger for successive reciprocations for any given adjustment of the usual plunger operating mechanism of the feeder and without substantially altering the glass shaping characteristics of the strokes of the successive reciprocations of the plunger, whereby mold charges of different weights but of substantially the same symmetrical shape will be obtained for the plunger reciprocations of different length.

A further object of the invention is to provide a glass feeder and an attachment therefor, as described, which can be adjusted to vary within a considerable range the difference between the weights of the mold charges obtained for the plunger reciprocations of different length or so that the plunger reciprocations for any given adjustment of the plunger operating mechanism of the feeder will be of the same length when it is desired to obtain mold charges of the same weight for successive reciprocations of the plunger.

Other objects and advantages of the invention will be apparent from the following description, when considered in conjunction with the accompanying drawings in which, Figure 1 is a view mainly in elevation and partly in section, of an assembly embodying essential elements of a glass feeder of the type disclosed in the patent to Lorenz 1,596,438 and equipped with an attachment embodying the present invention, Fig. 2 is a section substantially along the line 2—2 of Fig. 1, Fig. 3 is a fragmentary side elevation of part of the novel attachment that the invention provides, with the associated feeder parts omitted, and Fig. 4 is a view mainly in plan, of the structure shown in Fig. 3, with a portion thereof shown in section.

The glass feeder exhibited in Figs. 1 and 2 comprises a glass container 10 which may be a forehearth of a glass melting furnace. The glass container 10 has a discharge outlet 11 in its bottom. A vertically reciprocating plunger 12 depends in the glass in the container 10 substantially in axial alignment with the outlet and regulates the discharge of glass through the outlet so that the issuing glass will be suspended in successive masses from the outlet and will be shaped while thus suspended in the intervals between the severing of mold charges from such masses. Shear blades 13 are mounted to close periodically beneath the outlet in timed relation with the reciprocations of the plunger to sever mold charges from the preshaped suspended masses of glass. A tube 14 may surround the vertically adjustable plunger 12 within the glass container for regulating the flow of glass to the outlet.

The plunger operating mechanism comprises an arm 16 which is mounted on a supporting bracket 17 by suitable devices, including the wing nuts 18 and 19. The plunger is maintained in alignment with the outlet during its reciprocations by a guide rod 21 which slides in a vertical opening in a fixed portion of a supporting frame 15 for the plunger operating mechanism. The supporting frame 15 may be joined to the forehearth frame.

Motion is imparted to the bracket 17 to effect reciprocation of the plunger from a cam 37 through the intermediacy of a link 22, a compound lever comprising the arms 23 and 24 and the adjusting screw 26, a compound link 28—42, and a cam roll 46. The members 23 and 24 of the compound lever are mounted on a pivot 25. The adjusting screw 26 is carried by an upturned projection on the member 24 and bears against an upturned projection 27 on the arm 23. The upper end of the member 28 of the compound link carries a pivot member 70 (see Fig. 2) which extends through and is slidable along an arcuate slot 30 in the arm 23. The member 28 of the compound link is hinged to the member 42 of such link by a pivot pin 43 which is carried by a vertically swingable radius arm 44. The latter is pivoted at 45 to a bracket on the frame 15. A pivot that connects a cam roll 46 with the member 42 of the compound link is carried by an arm 47 which is pivotally supported on an eccentrically mounted pivot pin 48. The pin 48 may be turned about its eccentric axis to adjust the cam roll 46 circumferentially along the surface of the cam 37 by means of a worm gear 50 operable by a manually actuated worm 51. The worm 51 can be locked to the gear 50 to prevent accidental adjustment of the cam roll 46 circumferentially of the cam 37, by means of a wing nut 60 on a bolt 57 which connects the pivoted worm supporting frame 59 with a lug 58 on the frame 15.

The parts which have been described so far are substantially identical with corresponding parts of the glass feeder disclosed in the aforesaid patent to Lorenz No. 1,596,438 and therefore need not be described in greater detail herein.

It will be understood from the disclosure of the aforesaid patent and from the description hereinbefore given that rotation of the cam 37 will cause reciprocation of the plunger 12 toward and from the outlet 11 and that the shears 13 will be operated to sever a mold charge from the mass of glass suspended below the outlet for each reciprocation of the plunger 12. The screw 26 may be adjusted to vary the lowest position of the plunger stroke in respect to the outlet. The adjustment of the connecting pivot 70 between the lever member 23 and the compound link 28—42 along the slot 30 varies the amplitude of the reciprocation of the plunger without varying the lowest limit of the plunger stroke and therefore may be said to change the highest position of the plunger. The adjustment of the cam roll circumferentially of the cam 37 adjusts the time of the reciprocations of the plunger in respect to the time of the shearing operations. These adjustments tend to vary the size or shape or both size and shape of the mold charges which are severed from successive masses of glass suspended from the outlet, as has been hereinbefore pointed out.

In the construction shown in the aforesaid Lorenz patent, the pivot pin that connects the compound link 28—42 with the lever member 23 is slidable in the slot that corresponds to the slot 30 and may be adjusted longitudinally of such slot by means of a screw 29. The screw 29 in the Lorenz patented construction is in threaded engagement with an extending end portion of the pivot pin 70 and is journaled in a swivel block that is pivoted to the outer end of the member 23. In carrying out the present invention, the swivel block for holding the adjusting screw 29 against longitudinal movement is omitted and a novel construction that will be hereinafter described in detail is provided for adjusting the pivot pin 70 longitudinally of the slot 30.

Such adjusting means comprises a block 71, Fig. 2, which surrounds the pivot pin 70 and is slidable freely in the slot 30. The block 71 may be placed in and removed from the slot 30 at the outer end of the latter when the removable closure structure indicated at 72 in Fig. 1 has been removed from the outer end of the slot. The block 71 has flanges at its opposite ends which overlap the edge portions of the slot 30 and thus prevent displacement of the block laterally of the slot.

The pivot pin 70 preferably has an extending end portion thereof enlarged at 73 and provided with a transverse opening 74 that is threaded for engagement with the threads of the adjusting screw 29. The enlarged portion 73 of the pivot pin 70 is split longitudinally from its extremity through the transverse opening 74 and the wings of the split portion 73 of the pivot pin are united by a screw 75 which can be tightened to lock the pivot pin 70 to the adjusting screw 29.

The adjusting screw 29 is provided with a hand wheel 76 at one end. The other end portion of the screw 29 is journaled in a transverse opening in a pivot pin 76'. The pivot pin 76' is journaled in the fork arms of a crank arm 78. The screw 29 is provided with stop collars 77 in either side of the pivot pin 76'. This construction provides a pivotal connection between the screw 29 and the crank arm 78 and also permits manual turning of the screw 29 about its longitudinal axis. The upper end of the crank arm 78 is secured to a short rock shaft 79 that is journaled in a bracket 80 on the upper part of the main frame 15 or an extension thereof. The shaft 79 also carries a depending crank arm 81 which may be substantially parallel with the crank arm 78. The lower end of the crank arm 81 is connected pivotally by a link 82 and the pivot pins 83 and 84 respectively, with a dove-tail slide block 85 that is slidable in a dove-tail slideway 86 in one face of a lever 87 (see Fig. 4). The slide block 85 and therefore the pivotal connection between the link 82 and the lever 87 may be adjusted longitudinally of the lever 87 by means of an adjusting screw 88 which is journaled at 89 (see Figs. 1 and 3) in the top of the slideway 85 and is threaded through an opening in the slide block. The lever 87 is fulcrumed adjacent to its lower end on a transverse pivot pin 90. The pivot pin 90 is carried by a portion of a main frame 15 and terminates rearwardly of the slideway 86 so that the slide block 85 may be adjusted downwardly in the slideway 86 until the axis of the pivot pin 84 coincides with the axis of the pivot pin 90 for a purpose to be presently described. The screw 88 may be locked to the lever 87 by means of a lock screw 91 when the slide block has been adjusted to a desired position in the slideway. The adjusting screw 88 preferably is provided with a hand wheel 92 at its upper end for convenience of manipulation thereof.

The lever 87 receives motion from a cam 93 through the agency of a cam roll 94 that is supported on the lever 87 in position to enter and have a rolling contact with an endless cam groove 95 in the adjacent face of the cam disk. The cam disk is mounted on a shaft 96 that is journaled in a bearing structure 97 (see Fig. 2). The bearing structure 97 is secured to the main frame 15 so that the cam shaft 96 will be disposed parallel with the shaft 31 on which the main cam 37 is supported. A motion transmitting connection is provided between the shafts 31 and 96 so that the shaft 96 will be rotated at a desirable slower speed than the shaft 31 and in unison with the shaft 31. Such motion transmitting connection may comprise a speed reduction gear train indicated at 98 in Fig. 2, so that the shaft 96 will be rotated at one-half the speed of the shaft 31. The cam 93 therefore will describe but one complete rotation about its axis while the cam 37 completes two complete rotations about its axis.

The cam groove 95 has a relatively small portion of its working surface formed as indicated at X in Fig. 3 to actuate the lever 87 through the cam roll 94 as required to effect shifting of the block 71 in the slot 30 toward the outer end of the slot 30 from any position to which the block 71 has previously been moved in the slot 30. An equal portion indicated at Y of the working surface of the cam groove 95 is diametrically opposite the portion X and is adapted to engage with the cam roll 94 so as to swing the lever 87 as required to shift the block 71 inwardly along the slot 30 to the position from which such block was moved when the cam roll 94 traversed the portion X of the cam groove 95. The remaining portions W and Z of the working surface of the cam groove 95 are concentric with the axis of rotation of the cam and subtend equal angles. Therefore the contact of the cam roll 94 with such concentric portions does not effect any swinging movement of the lever 87.

From the foregoing description of the various parts of the device, the operation thereof may be readily understood. For convenience of explanation, let it be assumed that it is desired that every other mold charge to be delivered by the feeding apparatus equipped with the invention shall be two ounces heavier than the remaining mold charges. Let it also be assumed that the cam roll 94 is in the portion Z of the cam groove. The locking screw 75 is loosened to permit actuation of the adjusting screw 29 as required to shift the block 71 along the slot 30 to the proper position for applying power to the compound lever 23—24 as required to produce a plunger stroke that will so regulate the discharge of glass from the outlet 11 between successive shearing actions that a mold charge of the desired lower or base weight will be obtained at each shearing operation. The screw 75 then is tightened to lock the screw 29 to the pivot pin 70. The screw 91 then is loosened sufficiently to permit actuation of the adjusting screw 88, and the slide block 85 is adjusted in the slideway 86 to adjust the amplitude of the cam actuated stroke of the lever 87. The stroke of the lever 87 is adjusted in this manner to shift the slide block 71 along the slot 30 a sufficient distance to increase the amplitude of the upward stroke of the plunger 12 for every other reciprocation of the plunger, so that every other mold charge obtained will have a weight two ounces greater than the weight of the preceding mold charge. The lock screw 91 then is tightened to prevent accidental turning of the adjusting screw 88.

When these adjustments have been effected, the operation of the feeder will be entirely automatic. The turning of the cam 37 in a counter-clockwise direction from the position shown in Fig. 1, will cause a rise or upward stroke of the plunger 12 that will be relatively rapid at first, and then will continue more slowly for a relatively large part of the cycle of turning movement of the cam. The cam 93 will be turned at the same time in the same direction from the position shown best in Fig. 3 with the cam roll 94 in contact with the portion W of the cam groove 95. Before the plunger reaches its upper limit, the contact of the cam roll 94 with the portion X of the working surface of the rotating cam 93 will effect an outward shifting of the block 71 in the slot 30 sufficient to decrease the length of a reciprocation of the plunger as required for the securing of the smaller basic mold charge. The cam roll 94 then will contact with the concentric portion Z of the cam groove 95 during the down stroke of the plunger to complete a plunger reciprocation of relatively short length for the formation of a mold charge of the small basic size and until the more rapid portion of the succeeding upstroke of the plunger has been completed and the slower continued upward movement of the plunger is occurring. The cam roll 94 then will contact with the portion Y of the cam groove and will actuate the lever 87 so as to shift the block 71 inwardly along the slot 30 to the position suitable to cause the longer reciprocation of the plunger for the securing of a mold charge of the greater weight. The cam roll 94 then will again strike the concentric portion W of the cam groove 95 and will move in contact with the latter substantially to the position shown in Fig. 3 while the plunger moves downward to complete its relatively long reciprocation for the formation of a mold charge of the larger size. This completes a cycle of rotation of the cam 93 from the position shown in Figs. 1 and 3 and of operation of the parts actuated by such cam. Such cycles will automatically take place in succession so that every other mold charge delivered by the feeder will be of the same greater weight and the intermediate charges of the same lesser weight. As shown, the slideway 86 in the lever 87 is substantially straight. Theoretically, adjustment of the block 85 along such slideway 86 by means of the hand wheel 92 for the purpose hereinbefore described will result in a movement of the block 71 along the slot 30 although in actual practice this unintended movement of the block 71 in the slot 30 upon adjustment of the slide block 85 is relatively slight. It is obvious, however, that the effect of such unintended movement of the block 71 upon adjustment of the slide block 85 may be entirely removed by a sufficient preadjustment of the block 71 in the slot 30 by means of the adjusting screw 29 as hereinbefore described to compensate for such relatively slight further movement of the block 71 when the slide block 85 is adjusted. It also is obvious that even the aforesaid slight unintended movement of the block 71 in the slot 30 when the slide block 85 is adjusted may be obviated by forming the slideway 86 along an arc of a circle struck by a radius moving about the axis of the pivot pin 83 when the cam roll 85 is in a concentric portion of the cam groove as taught by the aforesaid patent to Lorenz 1,596,438 in which the cam groove 30 extends along an arc of a circle concentric with the axis of rotation of the cam 37 when the plunger 12 is at the lower limit of its cam-controlled stroke, whereby adjustment of the block 71 along the slot 30 does not cause a change of the lower limit of the stroke of the plunger 12.

In the event that it is desired that the operation of the cam 93 shall be ineffective to change the amplitude of alternate reciprocations of the plunger 12, the screw 88 is actuated to adjust the slide block 85 downwardly in the slideway of the lever 87 until the axis of the pivot element 84 will be aligned with the axis of the fulcrum pin 90. The oscillations of the lever 87 then will be ineffective to transmit motion through the connecting parts to the block 71. Consequently, the successive reciprocations of the plunger will have the same amplitude and the feeder will deliver successive mold charges of the same weight.

One important feature of advantage of the present invention arises from the capability of adjustment of the attachment to vary the amplitude of certain reciprocations of a cam actuated reciprocating feed regulating plunger after the lowest position of the plunger for such reciprocations has been adjusted without altering such lowest position of the plunger and without substantially changing the characteristic gradations of movement of the strokes of the altered plunger reciprocations. Consequently, the mold charges secured through the operation of a practical embodiment of the invention are of alternately different weights, but of generally the same predetermined artificial shape.

It is obvious, also, that the plunger reciprocation that is altered, need not be every second reciprocation, but that a suitable cam 93 may be used in place of that illustrated and driven at an appropriate speed to change the amplitude of reciprocation of certain of a series of plunger reciprocations in any desired cyclic order, so as to periodically change the weight of certain of a series of successive mold charges. For example, every third reciprocation of the plunger might be altered instead of every other reciprocation. Also, the apparatus shown may readily be altered to cause the formation in a cyclic order of three or more successive charges, each of a different weight.

I claim:

1. In glass feeding apparatus having a container for molten glass provided with a discharge outlet and an implement reciprocable in the glass toward and from the outlet to regulate the discharge of glass therethrough, an oscillatory lever connected with said implement for reciprocating the latter, power means adjustably connected with said lever for oscillating said lever to effect cycles of reciprocation of the implement, and automatic means for varying the place of application of power from said power means longitudinally of said lever for different oscillatory strokes of the lever to vary in a cyclic order the extent of the corresponding reciprocations of the lever, whereby the mold charge masses delivered through the outlet will vary in size in a cyclic order.

2. In glass feeding apparatus, a container for molten glass having a submerged outlet, an implement reciprocable in the glass toward and from the outlet for regulating the flow of glass through the outlet, means for reciprocating said implement, means for adjusting said implement operating means to regulably predetermine the limit of the strokes of the implement toward the outlet, manually operable means for adjusting said implement operating means to vary the amplitude of the reciprocations of the implement without changing the limit of the strokes of the implement toward the outlet, and automatic means for periodically actuating said amplitude adjusting means to further change the amplitude of alternate reciprocations of the implement without changing said limit of movement of the implement strokes toward the outlet, whereby alternate mold charges delivered through said outlet will be of different size than the remaining mold charges.

3. In glass feeding apparatus having a container provided with a discharge outlet, an implement reciprocable in the glass toward and from the outlet for controlling the flow of glass through the outlet, an oscillatory lever adjacent to said container, motion transmitting connections between said lever and said implement, whereby the oscillations of said lever will cause reciprocations of said implement, a cam adjacent to said lever, a motion transmitting member actuated periodically by said cam and adjustably connected with the lever to oscillate said lever, a second cam adjacent to said lever, and means actuated by said second cam to shift the connection between said lever and said lever oscillating member longitudinally of the lever so as to vary in a cyclic order the extent of different oscillations of said lever, whereby the amplitude of different reciprocations of the implement will be varied in a corresponding order and mold charge masses of different sizes will be delivered in a cyclic order through said outlet.

4. In glass feeding apparatus, a container for molten glass having a submerged outlet, an implement reciprocable in the glass toward and from the outlet for regulating the discharge of glass through the outlet, an oscillatory lever connected with said implement for reciprocating the implement, a cam actuated link, a pivot element connecting the link with said lever, said pivot element being adjustable longitudinally of the lever to vary the amplitude of the cam actuated reciprocations of the implement, and automatically operated means for oscillating said pivot element longitudinally of the lever in timed relation to the reciprocations of the implement.

5. In glass feeding apparatus, a container for molten glass having a submerged outlet, an implement reciprocable in the glass toward and from the outlet for regulating the discharge of glass through the outlet, an oscillatory lever connected with said implement for reciprocating the implement, a cam actuated link, a pivot element connecting the link with said lever, said pivot element being adjustable longitudinally of the lever to vary the amplitude of the cam actuated reciprocations of the implement, and automatically operated means for oscillating said pivot element longitudinally of the lever in timed relation to the reciprocations of the implement, so that the respective strokes of each oscillation of said pivot element longitudinally of the lever occur during successive cycles of reciprocation of the implement.

6. In glass feeding apparatus, a container for molten glass having a submerged outlet, an implement reciprocable in the glass toward and from the outlet for regulating the discharge of glass through the outlet, an oscillatory lever connected with said implement for reciprocating the implement, a cam actuated link, a pivot element connecting the link with said lever, said pivot element being adjustable longitudinally of the lever to vary the amplitude of the cam actuated reciprocations of the implement, a second lever, motion transmitting connections between said second lever and said pivot element, cam actuated means for oscillating said second lever to cause a movement of said pivot element in one direction longitudinally of the first lever during a cycle of reciprocations of the implement and a return movement of the pivot element along said first named lever during a subsequent cycle of reciprocations of the implement, and manually operable means for terminating and re-establishing the motion transmitting relation between said second lever and its associated motion transmitting connections during the operation of said second lever.

7. In a glass feeding apparatus having a container for molten glass provided with a discharge outlet and a feed regulating implement reciprocable in the glass toward and from the outlet, an actuator, operating connections between the actuator and the implement, and automatic means acting on said connections for imparting an additional movement to the implement.

8. In a glass feeding apparatus having a container for molten glass provided with a discharge outlet and a feed regulating implement reciprocable in the glass toward and from the outlet, an actuator, operating connections between the actuator and the implement, and means acting on said connections for automatically varying the effective leverage thereof to vary the stroke of the implement.

Signed at Hartford, Connecticut, this 31st day of October, 1927.

WILLIAM T. BARKER, Jr.